No. 700,566. Patented May 20, 1902.
F. SCHUMANN.
POTATO PLANTER.
(Application filed July 9, 1901.)
(No Model.) 2 Sheets—Sheet 2.
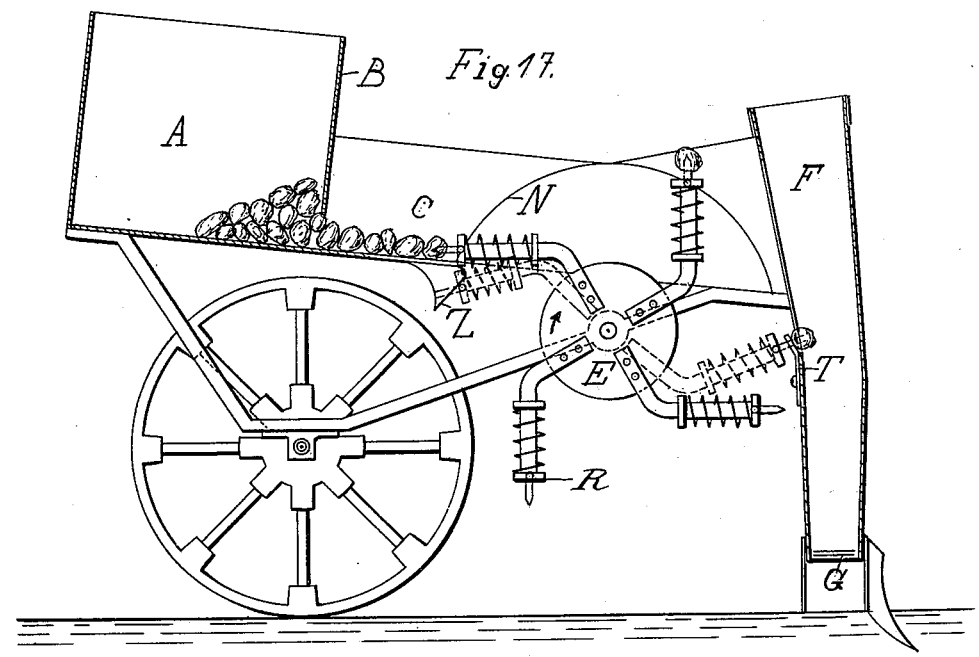
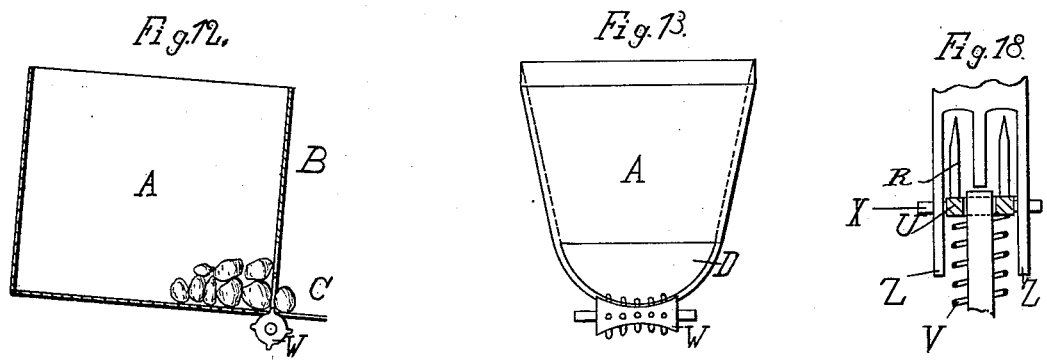
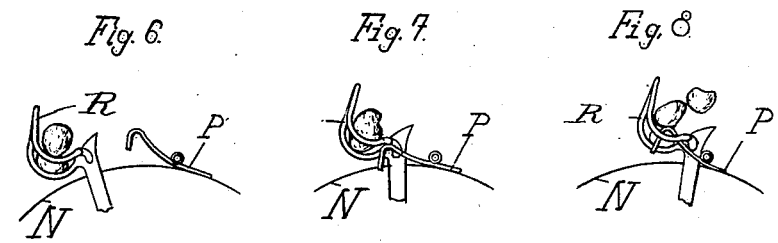
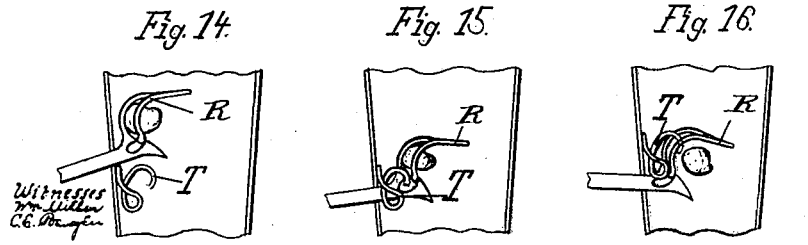
Inventor
F. Schumann
by W. C. Hauff
Atty
Witnesses No. 700,566. Patented May 20, 1902.
F. SCHUMANN.
POTATO PLANTER.
(Application filed July 9, 1901.)
(No Model.) 2 Sheets—Sheet 1.
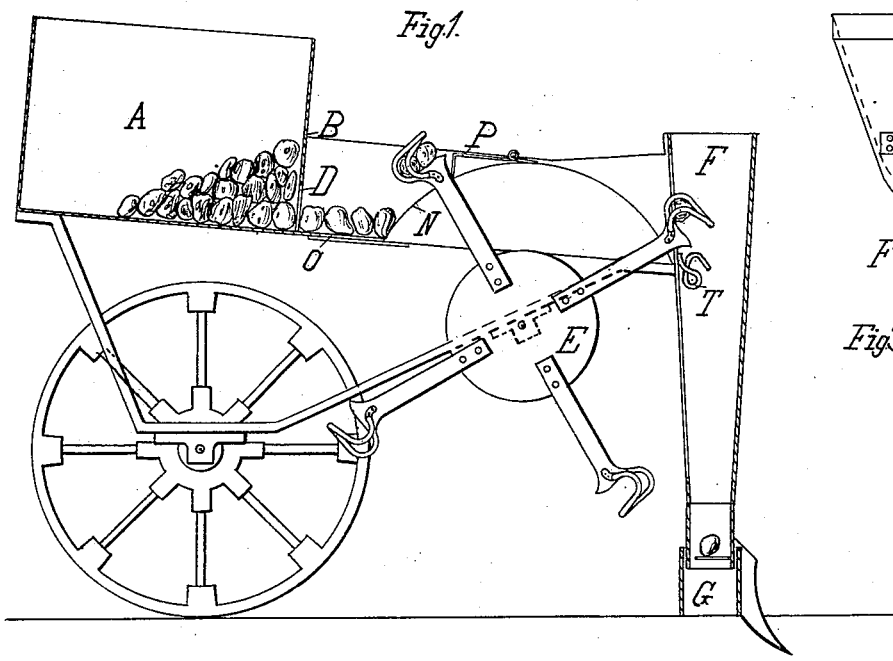
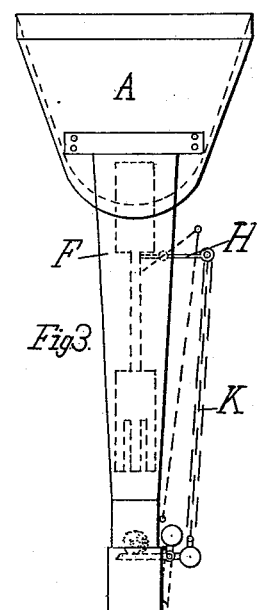
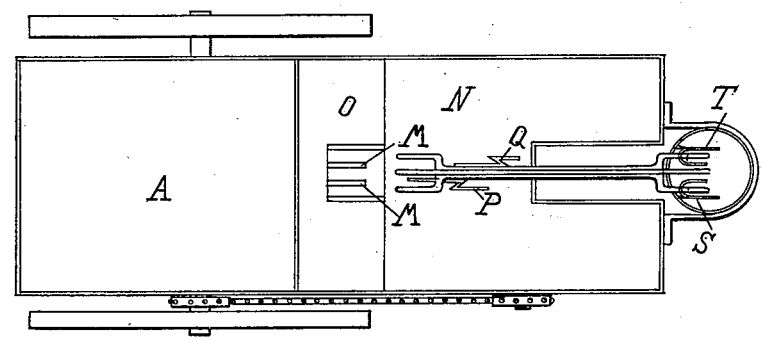
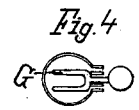
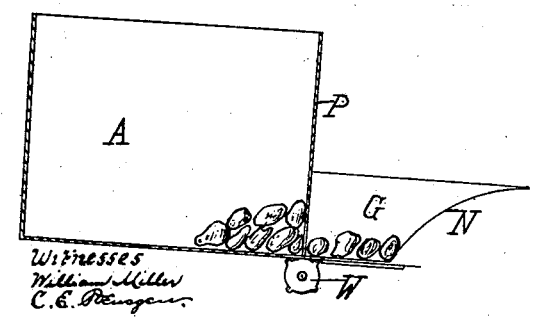
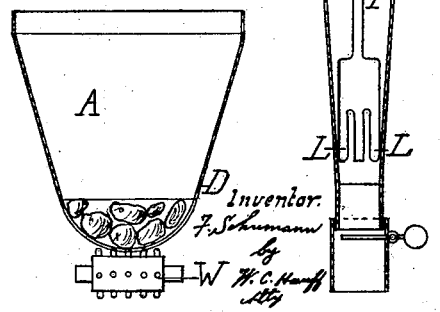

UNITED STATES PATENT OFFICE.

FERDINAND SCHUMANN, OF LEIPSIC KLEIN-ZSCHOCHER, GERMANY, ASSIGNOR TO MAX STEINBERG, OF LEIPSIC, GERMANY.

POTATO-PLANTER.

SPECIFICATION forming part of Letters Patent No. 700,566, dated May 20, 1902.

Application filed July 9, 1901. Serial No. 67,676. (No model.)

*To all whom it may concern:*

Be it known that I, FERDINAND SCHUMANN, a subject of the King of Saxony, residing at Leipsic Klein-Zschocher, in the Kingdom of Saxony and Empire of Germany, have invented new and useful Improvements in Potato-Planters, of which the following is a specification.

The potato-planters heretofore in use and which employ a scoop-wheel or similar conveying means have the drawback that the supply-receptacle being completely filled with potatoes the extraction or withdrawal of the latter is unreliable, since stoppages and irregularities occur in consequence. At times too many potatoes are withdrawn or some potatoes being carried out by the scoop contact with adjacent ones and are caused to drop off, leaving the scoop to issue without potatoes from the supply-compartment. To avoid the irregular withdrawal, it has been customary heretofore to conduct or feed the potatoes separately from the supply-compartment to the planting arrangement by means of a channel or conduit. This feeding method is unreliable, since it acts in but one direction and any obstruction easily disturbs the same. To avoid this disadvantage, the supply-receptacle of the present potato-planting machine is separated into two compartments and the separating-partition ending a short distance from their bottom a passage is provided, through which the potatoes can feed from the supply-compartment to the front chamber.
Thereby the number of potatoes fed to the front chamber is constant and the feeding results uniformly from all sides.

Figure 1 is a longitudinal section of the potato-planter. Fig. 2 is a plan view thereof.
Fig. 3 shows the same in front view. Fig. 4 is a plan view of the feed-tube. Fig. 5 is a rear view of the same. Figs. 6, 7, and 8, as also Figs 14, 15, and 16, show in side view various positions of the scoop opposite the stripping device. Fig. 9 shows the scoop in front view. Figs. 10 and 12 are longitudinal sections of modified forms of the supply-compartment. Figs. 11 and 13 are vertical sections thereof, respectively. Fig. 17 is a longitudinal section of a modified form of planter. Fig. 18 shows in detail a part of the same.

The drawings show a two-wheeled machine. The carriage-frame supports the supply compartment or receptacle A, which latter communicates with the forward compartment C through the partition B. The receptacle or container comprising the two compartments is held at an incline, so that the weight of the potatoes causes the latter to pass or roll forward through opening or passage D in partition B into the compartment C. The incline of the container-bottom and the size of opening D determines the quantity of potatoes passing into the forward compartment C. To the carriage-frame is also rotatably journaled the scoop-wheel E, which in the example shown has four scoop-arms; but of course this number can be varied. Rotary motion is transmitted to the scoop-wheel shaft from the carriage-wheel shaft or axle by means of chain connection or in other well-known way, so that rotation of such scoop-wheel shaft occurs simultaneously with the travel of the carriage or machine. The scoop-wheel E is mounted in such manner that on its rotation the scoops brush or pass through the forward compartment C to take potatoes from the latter. The potatoes withdrawn are dropped by the scoops into the seed tube or chute F, the lower end or outlet of which is closed by the valve G, and on the periodical opening of such outlet the potatoes are deposited. The potatoes therefore do not fall directly from the scoops into the furrow, but from the valve G, which latter is attached in the seed-tube close above the surface of the ground. As the distance of drop is not great, the potatoes have no tendency to roll, but remain at their resting-place in the furrow.

The opening of valve G is caused, as shown, by the arms of the scoop-wheel, as will hereinafter appear. When an arm or its scoop enters the seed-tube, the valve G, on which rests the potato previously dropped into the tube, opens, so as to permit the potato entering the ground. In front of the channel I, which latter is enlarged at top and bottom, is located a lever H at the rear or inner side of the seed or planting tube F, Fig. 5, and on the rotation of the scoop-wheel E the arm of the entering scoop depresses the lever, and as the latter is connected by chain K with valve G such valve is opened and with lever H is moved to the position shown in dotted lines in Fig. 3, so as to allow the potato to fall to the ground. The valve is returned to closing position by its own weight. The enlargements at top and bottom of the channel or slit I in seed-tube F, Fig. 5, are necessary for the entrance and exit of the scoop. The enlargements can be provided with pins or other suitable skeleton obstructions L to prevent dropping therethrough of a seed-potato deposited in the tube F. For the same reason the opening in the bottom of the forward compartment, which must be provided to afford passage for the scoops, has the pins M to prevent untimely escape of the potatoes through such opening.

At the withdrawal of the potatoes from the forward compartment and in spite of their number or layers being limited it happens that two or more of the seed-potatoes, according as they are large or small, are gathered up by the scoop and that they become wedged therein; but the superfluous potatoes (as a rule but one large or two small potatoes should be planted) must be removed from the scoop before it enters the seed or planting tube. For this purpose the convexed bottom or elevation N, bordering on the forward compartment, is provided with a stripper or stripping device consisting of two spring-arms P and Q, which enter among the tines of the scoop as the latter travels past such arms, thereby throwing out the extra potatoes, and the latter falling on the convexed or inclined surface N are caused to roll back to the forward compartment. In Figs. 6 to 8 this operation is separately shown. In the position shown in Fig. 6 the bag-like-shaped scoop approaches the spring-arm P, which serves as a stripper. In the position in Fig. 7 the stripper strikes the outer tine R of the scoop, and is thereby depressed, and in the position shown in Fig. 8 the stripper P has been forced below past the tine R, and acting under its spring-pressure such stripper snaps from the rear into the bag-like scoop, whereby it imparts a forward motion to the contents of such scoop and throws out the superfluous potatoes, or in case a potato has wedged itself between the tines of the scoop it is loosened by such spring-stripper. A like arrangement is provided in the seed or planting tube F. The two spring-arms S and T serve to throw out the potatoes which have become lodged in the bag-like scoop as the latter passes over such spring-arms. In the position shown in Fig. 14 the tine R of the scoop has just reached the spring end of the stripper T. In Fig. 15 it passes over the same, and in the position in Fig. 16 the stripper finally springs between the tines of the scoop and throws the potatoes out of the latter. The scoop consists of three tines, Fig. 9, the two outer tines being of less curvature than the one in the center, so that a bag or like shape is imparted to the scoop and the potatoes lie therein as in a bag.

The supply-receptacle is preferably made in form of a mold, so that the layer of potatoes at the bottom is of small width, but the width of each succeeding or higher layer being increased. In this form of mold the potatoes move steadily to the lowest point without being interrupted.

When planting on ascending or descending ground, whereby the inclined position of the supply-receptacle A is changed, the potatoes are fed in unequal quantities or numbers underneath partition B into the forward compartment C. An unequal feeding will also occur when the halves or sections of potatoes that have been cut up are used for seed. To regulate the feeding in these instances, a feeding-roller W is arranged beneath the partition B—that is, in the passage or opening leading to the forward compartment—such roller affording free passage in the position shown in Fig. 10, while in Fig. 11 the passage is narrowed or partially closed. Through the rotating and stopping of this roller by means of interruption of the power arrangement the feeding of the potatoes to the forward compartment can be easily regulated. The roller W can be given a cylindrical form, Fig. 11, and provided with studs, or such roller can be made hollow or concave, Fig. 13, which will adjust itself or conform to the mold form of the supply-receptacle. The bottom of the receptacle can be provided with bearings for the roller-shaft or ends.

The potato-planting machine is provided with a plowshare, Fig. 1, to form the furrow in which the potatoes are laid, and behind the seed or planting tube F an arrangement can be applied to cover up the furrow. The latter is not shown in the drawings. Two or more devices for planting the potatoes can be arranged alongside one another, and the potato-planter can be combined with a planting-machine, the shovel or spade wheel of which forms the holes in which the potatoes are to be laid.

The example illustrated in Figs. 17 and 18 corresponds in the main to that shown in Fig. 1. As a conveyer, however, a wheel E, whose arms are provided with prongs or tines R, is employed instead of the scoop-wheel. These prongs are adapted to snap or pierce into the potatoes in the forward compartment C to be conveyed to the seed-tube F. The prongs or tines R are attached, for example, to the ring U, Fig. 18, which latter is movable on the arm of the conveyer-wheel against the action of spring V. When the wheel E rotates in the direction shown by arrows, Fig. 17, the studs or projections X of the ring U strike and pass over a pair of inclined slide tracks or ways Z, which are attached close to the under edge of the forward compartment, so that the tine or fork is retracted or pressed back against the action of spring V, as shown in dotted lines. When, however, the fork is released, the latter snaps into the forward compartment to pierce a potato. The cam-surfaces or sliding-ways Z reach only to the bottom of compartment C, so that the fork in its sudden forward movement can pass into the layer of potatoes in the forward compartment. On the further rotation of wheel E the pierced potato is conveyed into the seed-tube F, where it is removed or brushed off from the fork by the stripper T, which enters among the tines of the fork. The potato then drops on the valve G in the planting-tube. In other respects the potatoes are discharged as in the previously-described example.

It is noted that the objectionable feature of irregular planting and having a potato or seed drop from a considerable height and roll along a furrow is avoided by having a delivery-space in front of the seedbox, in which delivery-space the potatoes enter in several rows, but always in equally shallow layer irrespective of whether the seedbox contains many or few potatoes. The scoops thus sweep through an always-uniform layer of potatoes, and as the potatoes can flow equally from all sides to the point of delivery a withdrawal of only one potato at a time is assured. Should it occur that more than one potato is carried along by the scoop, the stripper assures the withdrawal of the surplus. To insure the several potatoes being planted at equal intervals, the same are delivered to a valve closing the lower end of the seed or planting tube and which is opened by the periodic movement of the arms of the scoop-wheel. The valve is so applied as to open crosswise to the direction of travel, causing the potato to fall transversely to the direction of the furrow, so that it cannot roll along therein. The potato thus remains at the point where it is delivered by the apparatus. The slight distance of drop and the transverse movement of the potato to the furrow prevent displacement or rolling.

The transversely-opening valve causing the potato to fall transversely to the furrow counteracts or prevents any tendency of the potato rolling along such furrow, and planting at equal intervals is assured. Furthermore, to prevent the potato which rests on the valve from being moved or displaced by the shocks or vibration of the traveling apparatus, whereby the potato might be caused to move laterally to the valve and roll along the furrow, such valve is to be formed of two tines or formed like a mold-shaped scoop. The potato is thereby held steadily in the plane in which it is placed, and thereby planting at uniform intervals is assured.

The scoop at the seedbox of the machine having a pocket or pouch-shape holds the potato within its three tines. This pouch form has the advantage, as compared with the flat spoon form, that the several potatoes are freely transported from the forward space to the planting-tube without prematurely dropping out.

By giving the seedbox a trough shape the potatoes, having a tendency to drop from all sides to the deepest point, will fill up all gaps caused by the removal of the potatoes at the withdrawing-point.

What I claim as new, and desire to secure by Letters Patent, is—

1. In a potato-planter a container provided with a partition dividing the same into a storage-compartment and a forward or spreading compartment in which the potatoes can spread into a thin layer of uniform thickness irrespective of the greater or less supply of potatoes in the storage-compartment, the lower edge of the partition being above the bottom of the container to thereby provide an opening, a convexed portion in said forward compartment, a wheel having arms provided with potato-carrying devices, and means adjacent to said convexed portion for forcing superfluous potatoes from said potato-carrying devices and onto said convexed portion.

2. In a potato-planter a container provided with a partition dividing the same into a storage-compartment and a forward or spreading compartment in which the potatoes can spread into a thin layer of uniform thickness irrespective of the greater or less supply of potatoes in the storage-compartment, the lower edge of the partition being above the bottom of the container to thereby provide an opening, a convexed portion in said forward compartment, a wheel having arms provided with potato-carrying devices, means adjacent to said convexed portion for forcing superfluous potatoes from said potato-carrying devices and onto said convexed portion, a tube located to receive potatoes from said potato-carrying devices, and a valve made to swing or open and close in said tube in the direction transversely to the travel of the planter.

3. In a potato-planter, a container, a wheel having arms provided with potato-carrying devices, a tube having a valve, a lever disposed in the path of the arms and adapted to be operated thereby, and a connection between said lever and valve, said valve being made to open in the direction transversely to the travel of the planter so as to prevent the outgoing potato from rolling along the furrow.

4. In a potato-planter, a container, a wheel having arms provided with potato-carrying devices and a tube to receive the potatoes, a wall of the tube having a slot consisting of wide portions and an intermediate narrow portion one of said wide portions having fingers in the same.

5. In a potato-planter, a container having a plurality of communicating compartments, a potato-spreading space or portion in the forward compartment, a wheel having arms arranged to travel through the forward compartment, said arms having potato-carrying devices, a tube arranged to receive the potatoes from said potato-carrying devices and slotted for the passage of said arms, and means in the forward compartment to expel superfluous potatoes from said potato-carrying devices.

6. In a potato-planter, a container having a plurality of communicating compartments, a convexed portion in the forward compartment, a wheel having arms arranged to travel through the forward compartment, said arms having potato-carrying devices, a tube arranged to receive the potatoes from said potato-carrying devices and slotted for the passage of said arms, means in the forward compartment to expel superfluous potatoes from said potato-carrying devices, and means for regulating the movement of the potatoes from the rear to the forward compartment.

7. In a potato-planter, a container for potatoes, provided with a partition for dividing the same into compartments the lower edge of the partition being above the bottom of the container to thereby provide an opening, a wheel situated below the container and provided with arms, a tube at the forward end of the container and arranged transversely thereto and the inner wall of the tube and the bottom of the container being slotted for the passage of said arms, potato-carrying devices on the arms, and means in said tube for positively dislodging the potatoes from said potato-carrying devices as they enter the tubes.

8. In a potato-planter, a container for potatoes, a tube, means for carrying the potatoes from the container to the tube, means in said tube for positively dislodging the potatoes from the carrying means, a valve for said tube, formed of a scoop-shaped plate and made to open transversely of the direction of travel of the planter, a plowshare for the tube, and means for automatically opening said valve.

In testimony whereof I have hereunto set my hand in the presence of two subscribing witnesses.

FERDINAND SCHUMANN.

Witnesses:
 RUDOLPH FRICKE,
 CHAS. J. BURT.